United States Patent
Turner et al.

(10) Patent No.: US 11,395,455 B2
(45) Date of Patent: Jul. 26, 2022

(54) AGITATION AND LEVELING CONTROL SYSTEM FOR PARTICULATE MATERIAL

(71) Applicant: CNH Industrial Canada, Ltd., Saskatoon (CA)

(72) Inventors: Jack Donald Turner, Saskatoon (CA); Graham Douglas Stuart, Warman (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 666 days.

(21) Appl. No.: 16/264,904

(22) Filed: Feb. 1, 2019

(65) Prior Publication Data
US 2020/0245538 A1    Aug. 6, 2020

(51) Int. Cl.
| | | |
|---|---|---|
| *A01C 15/00* | (2006.01) | |
| *B01F 27/72* | (2022.01) | |
| *B01F 27/1142* | (2022.01) | |
| *B01F 35/212* | (2022.01) | |
| *B01F 35/22* | (2022.01) | |
| *B01F 101/09* | (2022.01) | |

(52) U.S. Cl.
CPC ........ *A01C 15/007* (2013.01); *B01F 27/1142* (2022.01); *B01F 27/72* (2022.01); *B01F 35/212* (2022.01); *B01F 35/2209* (2022.01); *B01F 2101/09* (2022.01)

(58) Field of Classification Search
CPC ............ B01F 15/0201; B01F 15/00253; B01F 2101/09; B01F 35/2209; B01F 27/1142; B01F 27/72; A01C 15/007
See application file for complete search history.

(56) References Cited

U.S. PATENT DOCUMENTS

| | | |
|---|---|---|
| 4,561,781 A | 12/1985 | Seymour |
| 4,715,012 A | 12/1987 | Mueller, Jr. |
| 6,073,428 A | 6/2000 | Diekhans |
| 6,397,571 B1 * | 6/2002 | Ehrecke ............... A01D 41/127 460/1 |
| 6,427,107 B1 | 7/2002 | Chiu et al. |
| 6,655,351 B2 | 12/2003 | Sheidler et al. |
| 7,891,592 B2 | 2/2011 | Yamamoto et al. |
| 7,945,378 B2 | 5/2011 | Sheidler et al. |
| 8,601,963 B2 | 12/2013 | Friggstad |
| 9,187,098 B2 | 11/2015 | Love et al. |
| 9,264,188 B2 | 2/2016 | Thompson et al. |
| 9,265,188 B2 | 2/2016 | Thompson et al. |
| 9,488,119 B2 | 11/2016 | Frelich |
| 9,554,506 B2 | 1/2017 | Bittner et al. |
| 9,578,800 B2 | 2/2017 | Beaujot et al. |
| 9,751,058 B2 | 9/2017 | Bedord et al. |
| 9,903,299 B2 | 2/2018 | Homant et al. |
| 2002/0178981 A1 | 12/2002 | Drummond et al. |
| 2016/0278274 A1* | 9/2016 | Lopez .................... A01C 7/203 |
| 2017/0065949 A1* | 3/2017 | Bedord .................... G05D 9/12 |

* cited by examiner

*Primary Examiner* — Anshu Bhatia
(74) *Attorney, Agent, or Firm* — Rebecca L. Henkel; Rickard K. DeMille

(57) ABSTRACT

A particulate material agitation and leveling control system includes a controller having a memory and a processor. The processor is configured to receive a sensor signal indicative of a measured load on a drive system coupled to an agitation and leveling system, select an operating mode of the agitation and leveling system from an agitation mode and a leveling mode based on the measured load, and instruct the drive system to operate the agitation and leveling system based on the operating mode.

20 Claims, 6 Drawing Sheets

AGITATION AND LEVELING CONTROL SYSTEM FOR PARTICULATE MATERIAL

BACKGROUND

The disclosure relates generally to an agitation and leveling control system for particulate material.

Generally, agricultural seeding implements are towed behind a work vehicle, such as a tractor. These implements generally contain a particulate material, such as seeds, fertilizer, and/or other agricultural product, which is distributed on or in the ground using various methods. Certain implements include a storage tank in which the particulate material is stored and a metering system configured to meter the particulate material from the storage tank. The particulate material is distributed from the metering system to row units, which are configured to distribute the particulate material on or in the ground. As the storage tank is filled with the particulate material and/or while the particulate material flows from the storage tank to the metering system, the particulate material may form an undesirable profile within the storage tank. Several factors may contribute to this undesirable profile, including, but not limited to, friction between the particulate material and the storage tank, clumping of the particulate material, operation of the implement on a slope, and an inactive portion of the metering system. This undesirable profile may lead to uneven flow to the metering system, which may cause an unwanted distribution or no distribution of the particulate material over certain regions of a field. As a result, the crop yield within these regions may be reduced, thereby reducing the efficiency of the seeding process.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a particulate material agitation and leveling control system includes a controller having a memory and a processor. The processor is configured to receive a sensor signal indicative of a measured load on a drive system coupled to an agitation and leveling system, select an operating mode of the agitation and leveling system from an agitation mode and a leveling mode based on the measured load, and instruct the drive system to operate the agitation and leveling system based on the operating mode.

DRAWINGS

These and other features, aspects, and advantages of the present disclosure will become better understood when the following detailed description is read with reference to the accompanying drawings in which like characters represent like parts throughout the drawings, wherein.

Figure 4:
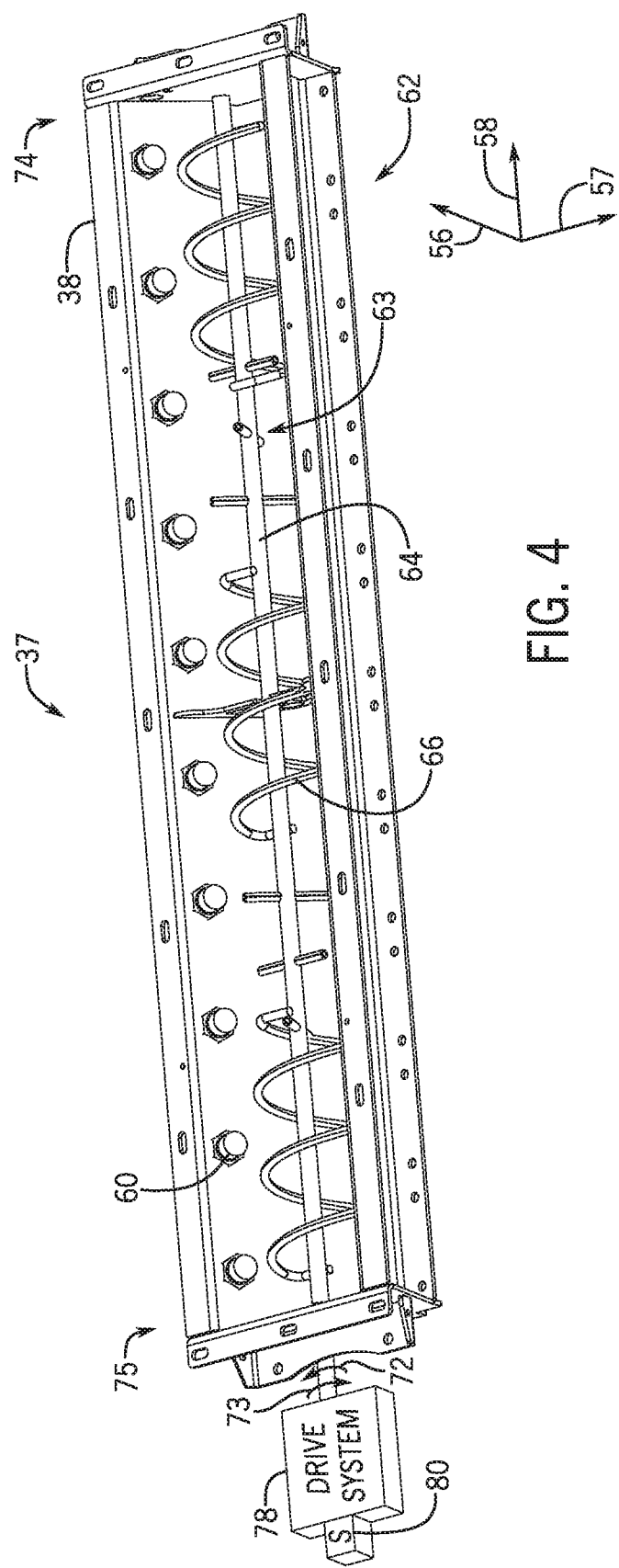
FIG. 4 is a top perspective view of the particulate material agitation and leveling control system of FIG. 3, in accordance with an aspect of the present disclosure.
Figure 5:
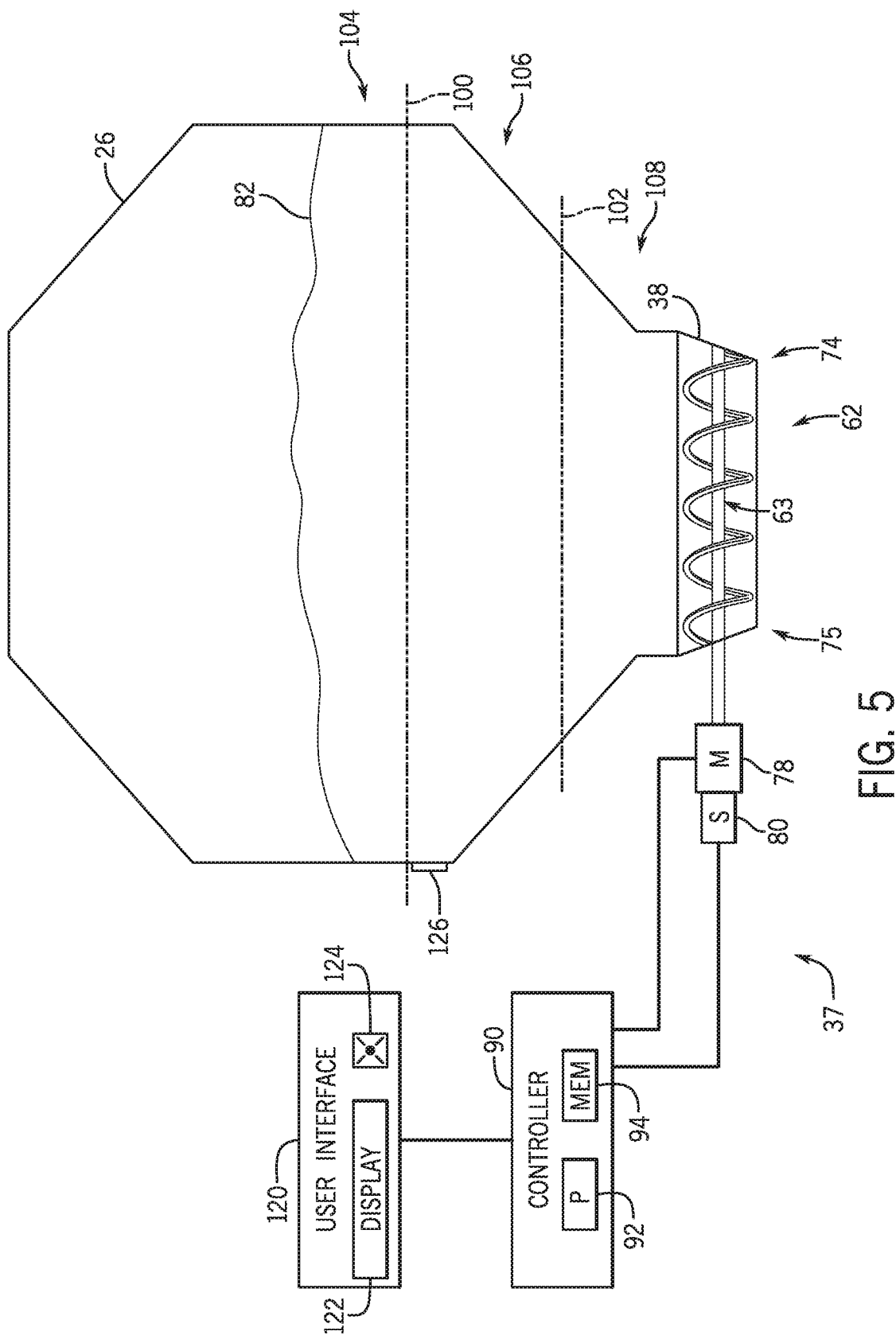
Figure 6:
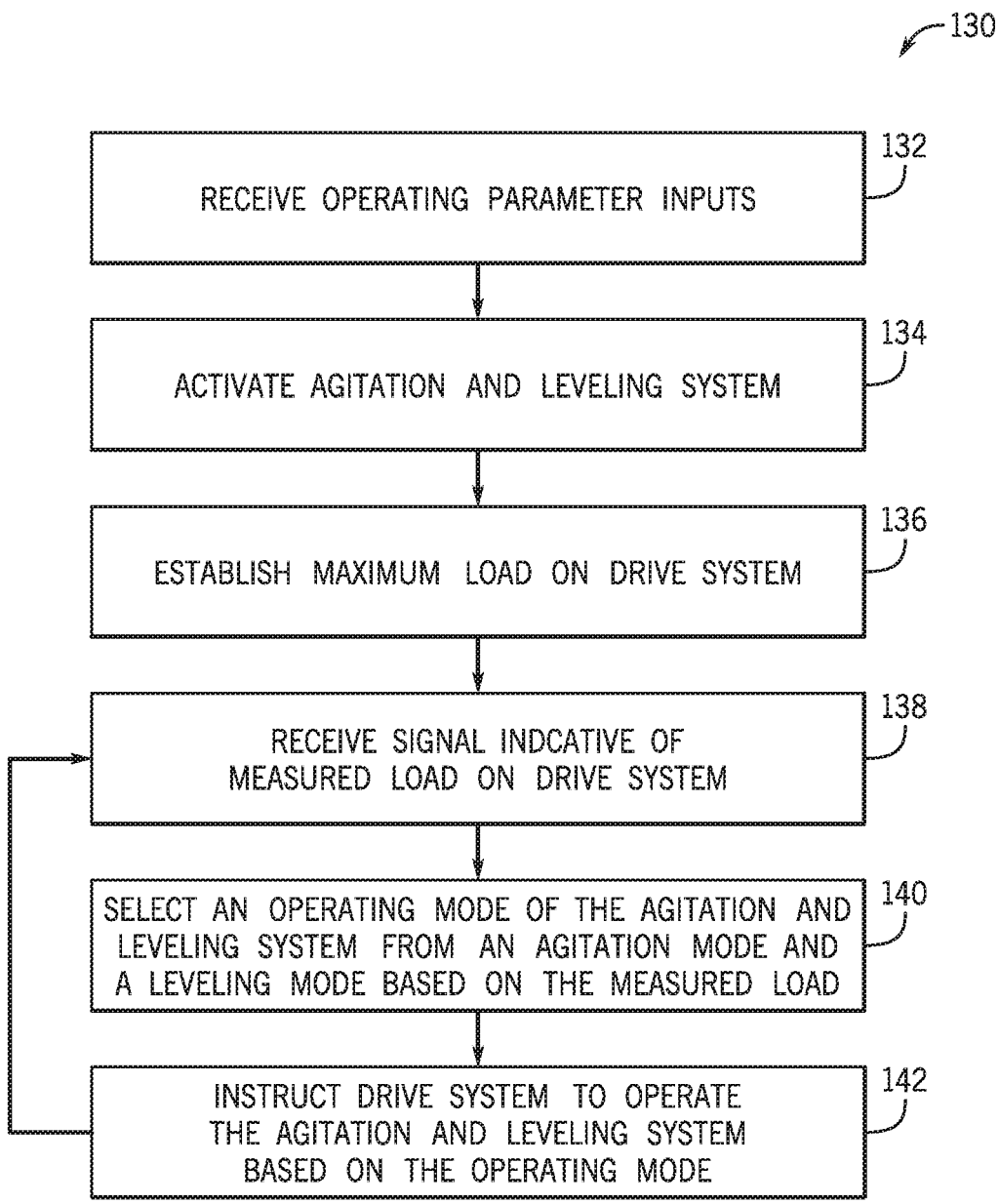

FIG. 5 is a cross-sectional view of an embodiment of a storage tank coupled to the particulate material agitation and leveling control system of FIG. 4, in accordance with an aspect of the present disclosure; and FIG. 6 is a flow diagram of an embodiment of a process for controlling a particulate material agitation and leveling control system, in accordance with an aspect of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments of the present disclosure include a particulate material agitation and leveling control system. Certain agricultural systems (e.g., air carts, implements, etc.) contain a particulate material (e.g., seeds, fertilizer, and/or other agricultural products) within a storage tank of the agricultural system. Certain agricultural systems include row units and/or are coupled to a respective implement having row units configured to distribute the particulate material within a field. The particulate material may flow from the storage tank through a metering system, which is configured to control the flow of the particulate material to the row units. As the storage tank is filled with the particulate material and/or as the particulate material flows from the storage tank through the metering system, the particulate material may clump together within the storage tank and/or a profile of the particulate material within the storage tank may change to an undesirable profile. In some embodiments, the storage tank may be filled at one side via a side door of the storage tank such that the particulate material is primarily distributed at the one side.

Accordingly, in certain embodiments, the agricultural system includes a particulate material agitation and leveling control system configured to reduce clumps within the particulate material and to control the profile of the particulate material. The particulate material agitation and leveling control system includes a sensor, an agitation and leveling system, a drive system, and a controller. The agitation and leveling system is configured to agitate and/or level the particulate material within the storage tank and/or within a hopper coupled to the storage tank. The sensor is configured to detect a measured load on the drive system coupled to the agitation and leveling system (e.g., a measured torque on the drive system caused by the agitation and leveling system rotating against resistance of the particulate material) and to output a signal to the controller indicative of the measured load. The controller is configured to select an operating mode of the agitation and leveling system based on the measured load and to instruct the drive system to operate the agitation and leveling system based on the operating mode.

The operating modes of the agitation and leveling system may include an agitation mode and a leveling mode. For example, while the agitation and leveling system is operated in the agitation mode, the agitation and leveling system agitates the particulate material within the storage tank and/or within the hopper. While the agitation and leveling system is operated in the leveling mode, the agitation and leveling system levels the particulate material within the storage tank and/or within the hopper.

In certain embodiments, the controller of the particulate material agitation and leveling control system may compare the measured load on the drive system to a threshold load and to select the operating mode based on the comparison. For example, the controller may select the agitation mode in response to the measured load being greater than or equal to the threshold load, and may select the leveling mode in response to the measured load being less than the threshold load. Additionally, in some embodiments, the controller of the particulate material agitation and leveling control system may determine the threshold load based on a maximum load sensed by the sensor or received via user input (e.g., the threshold load may be a percentage and/or fractional value of the maximum load).

In some embodiments, the controller of the particulate material agitation and leveling control system may operate the agitation and leveling system in a door dump mode. For example, after the particulate material is added to the storage tank via the side door, the controller may instruct the drive system to operate the agitation and leveling system in the door dump mode based on operator input, automatically based on operation of the side door, based on the measured load on the drive system, or a combination thereof. In the door dump mode, as the agitation and leveling system operates, the agitator may move the particulate material generally away from the side door to distribute the particulate material throughout the storage tank and/or the hopper.

Figure 1:
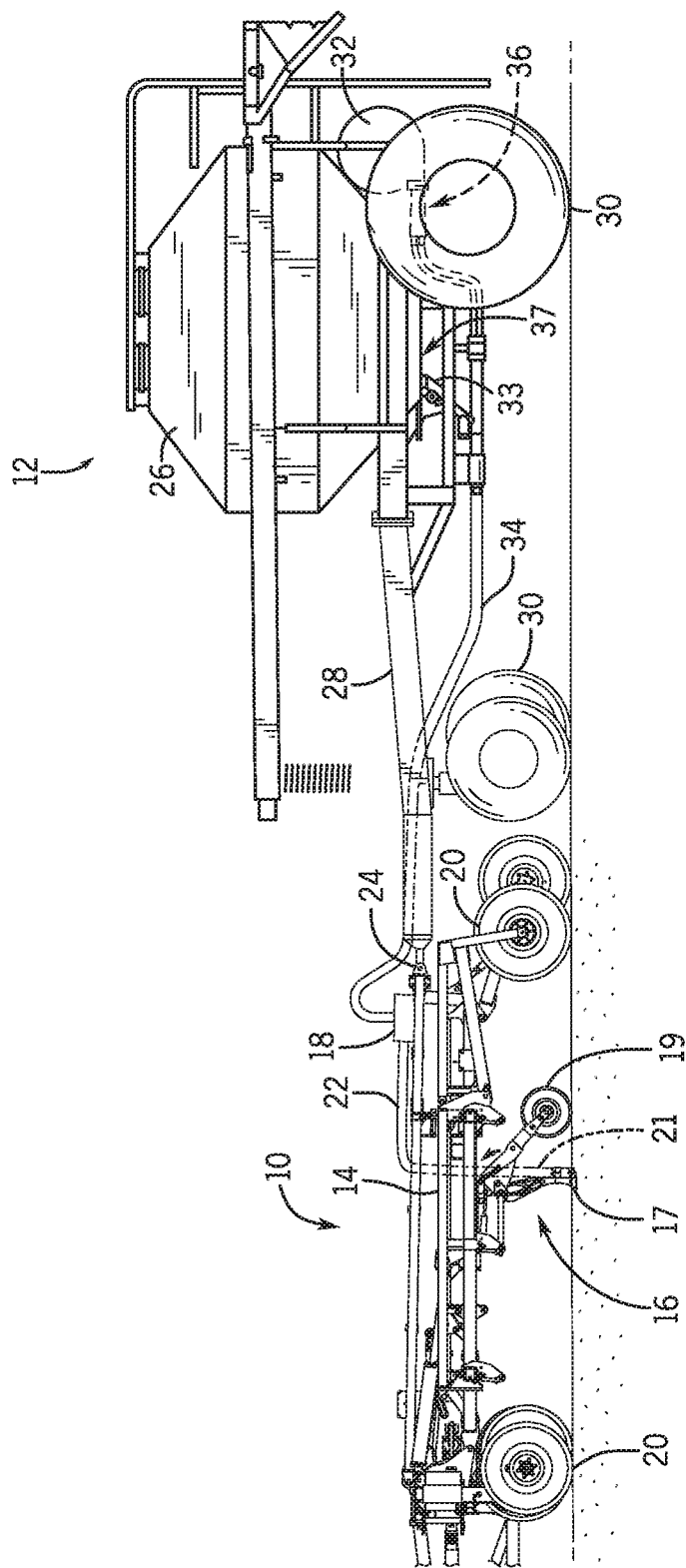
FIG. 1 is a side view of an embodiment of an agricultural implement coupled to an air cart, in accordance with an aspect of the present disclosure.

With the foregoing in mind, the present embodiments relating to particulate material agitation and leveling control systems may be utilized within any suitable agricultural system. For example, FIG. 1 is a side view of an embodiment of an agricultural implement 10 coupled to an embodiment of an air cart 12. A particulate material agitation and leveling control system may be used in the air cart 12. As depicted, the agricultural implement 10 includes a tool frame 14 coupled to a row unit 16 (e.g., ground engaging opener assembly), a header 18, and wheel assemblies 20. The agricultural implement may be pulled by a work vehicle (e.g., a tractor) to deposit rows of particulate material (e.g., agricultural product) within or on the soil. Wheel assemblies 20 may contact the surface of the soil to enable the agricultural implement 10 to be pulled by the work vehicle. As the agricultural implement 10 is pulled, a row of the particulate material may be deposited into the soil by the row unit 16 (e.g., ground engaging opener assembly). Although only one row unit 16 is shown, the agricultural implement may include multiple row units organized in one or more rows across the agricultural implement. In some embodiments, the agricultural implement may include one or more rows of 12, 14, 16, 18, 20, or more row units, which may each deposit a respective row of particulate material into the soil.

To facilitate depositing the particulate material, each row unit 16 (e.g., ground engaging opener assembly) in the illustrated embodiment, includes an opener 17, a press wheel 19, and a particulate material tube 21. While the opener 17 engages the soil, the opener 17 may exert a force onto the soil that excavates a trench into the soil as the row unit 16 travels through the field. The particulate material may be deposited into the excavated trench via the particulate material tube 21. Then, the press wheel 19 may pack soil onto the deposited particulate material. In certain embodiments, the press wheel of at least one row unit may be omitted. For example, at least one press wheel may be mounted to the frame of the implement behind the at least one row unit. Furthermore, while the illustrated row unit includes a ground engaging opener assembly, in alternative embodiments, at least one row unit on the implement may include an applicator assembly configured to deposit particulate material onto the surface of the field, or any other suitable type of product deposition assembly.

The header 18 may provide the particulate material to the row units 16. In some embodiments, the header 18 may pneumatically distribute the particulate material from a primary line to secondary lines. In the illustrated embodiment, a primary line 34 directs particulate material from the air cart 12 (e.g., a metering system 33 of the air cart) to the header 18. Additionally, the header 18 is configured to distribute the particulate material to the row units 16 via respective secondary lines 22. In certain embodiments, multiple primary lines may direct particulate material to multiple headers. Moreover, multiple secondary lines may extend from each header to respective row units. Furthermore, in certain embodiments, at least one secondary line may extend to a secondary header, and multiple tertiary lines may extend from the secondary header to respective row units.

In the illustrated embodiment, the air cart 12 is towed behind the agricultural implement 10. For example, the agricultural implement 10 may be coupled to the work vehicle by a first hitch assembly, and the air cart 12 may be coupled to the agricultural implement 10 by a second hitch assembly 24. However, in other embodiments, the agricultural implement may be towed behind the air cart. In further embodiments, the implement and the air cart may be part of a single unit that is towed behind the work vehicle or may be elements of a self-propelled vehicle.

The air cart 12 may centrally store particulate material and distribute the particulate material to the header 18. The air cart 12 includes a storage tank 26, a frame 28, wheels 30, and an air source 32. As illustrated, the second hitch assembly 24 is coupled between the tool frame 14 and the frame 28, which enables the air cart 12 to be towed with the agricultural implement 10. Additionally, the storage tank 26 is configured to centrally store the particulate material. In some embodiments, the storage tank 26 may include multiple compartments for storing different types of particulate material. For example, a first compartment may store seeds while a second compartment may store a dry fertilizer. In such configurations, the air cart 12 may deliver both seeds and fertilizer to the implement 10 via separate distribution systems, or as a mixture through a single distribution system. Further, a particulate material agitation and leveling control system 37 may be disposed in the storage tank 26 or in a hopper positioned between the storage tank and the metering system, and may be configured to agitate and/or level the particulate material in the storage tank 26 and/or hopper. For example, the particulate material agitation and leveling control system 37 may operate in an agitation mode and/or a leveling mode to agitate and/or level the particulate material in the storage tank 26 and/or hopper. In certain embodiments, the hopper may be a bottom portion of the storage tank such that the particulate material agitation and leveling control system may agitate and level the particulate material within the bottom portion of the storage tank.

From the particulate material agitation and leveling control system 37, the particulate material may be fed into the metering system 33, which meters the particulate material, fluidizes the particulate material via a fluidizing airflow from the air source 32, and distributes the particulate material to the header 18 via the primary line 34. As depicted, the metering system 33 is mounted to the bottom of the storage tank 26. To facilitate distributing the particulate material, the fluidizing air generated by the air source 32 is guided though the metering system 33 via a plenum 36. In some embodiments, the air source 32 may be one or more pumps and/or blowers powered by electric or hydraulic motor(s), for example.

Figure 2:
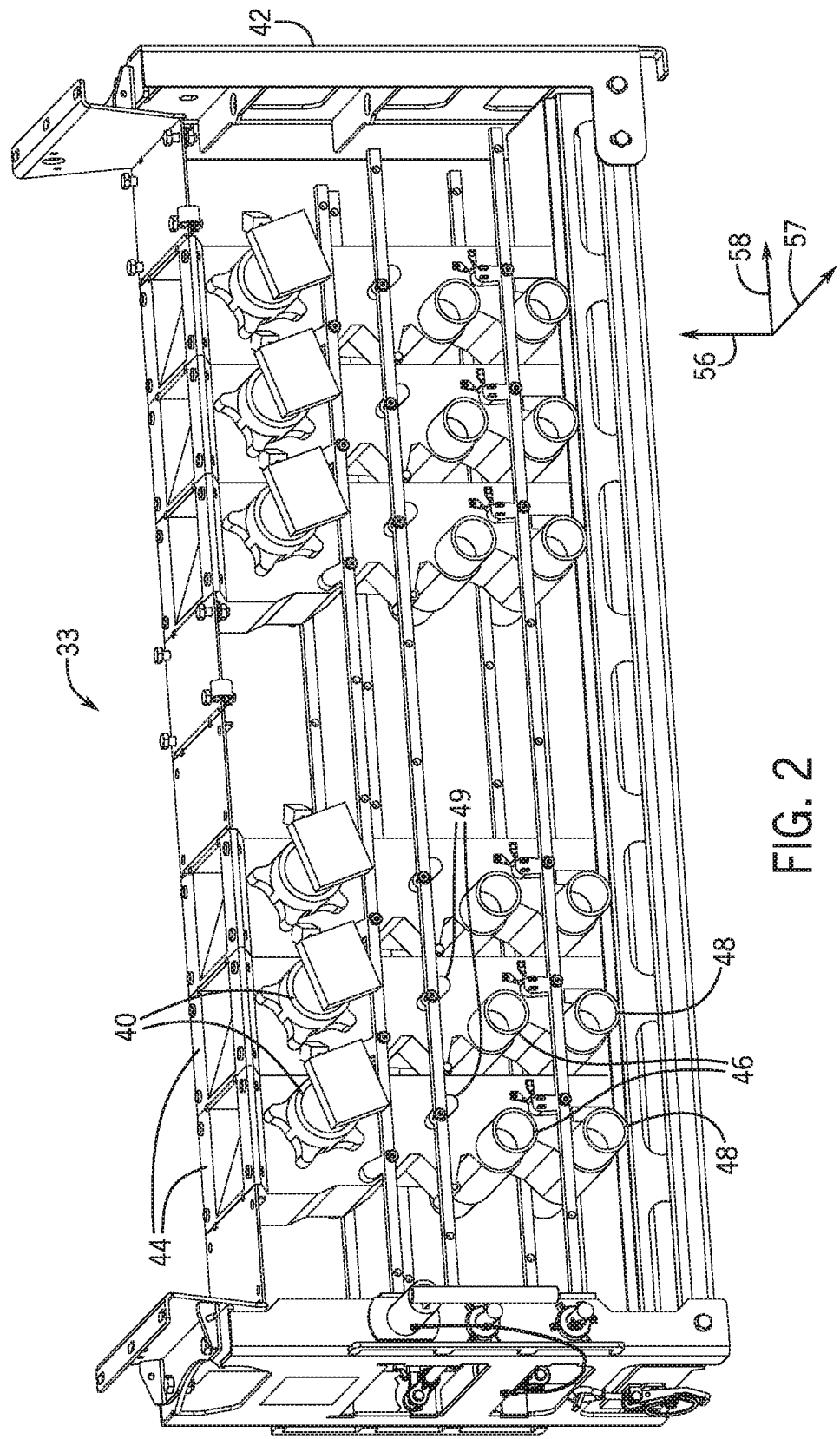
FIG. 2 is a perspective view of an embodiment of a metering system that may be employed within the air cart of FIG. 1, in accordance with an aspect of the present disclosure.

FIG. 2 is a perspective view of an embodiment of a metering system 33 that may be employed within the air cart of FIG. 1. As illustrated, the metering system 33 includes six material meters 40 (e.g., seed meters) supported by a frame 42. While the illustrated embodiment includes six material meters 40, more or fewer material meters may be employed in alternative embodiments. For example, certain metering systems may include 1, 2, 4, 6, 8, 10, 12, 14, or more material meters. In the illustrated embodiment, each material meter 40 includes at least one respective metering device (e.g., meter roller) to control flow of particulate material to a respective primary line. Each material meter 40 also includes an inlet 44 configured to receive the particulate material from an agitation and leveling system (e.g., along a vertical axis 56). Furthermore, each material meter 40 includes a first conduit connector 46 and a second conduit connector 48. Each conduit connector is configured to receive the air flow from the air source and the particulate material from the metering device, thereby producing an air/material mixture. First primary lines may be coupled to the first conduit connectors 46 and second primary lines may be coupled to the second conduit connectors 48. Furthermore, each material meter 40 includes a gate assembly 49 that enables selection of the first conduit connector 46 or second conduit connector 48. Once the first conduit connector 46 or the second conduit connector 48 is selected, particulate material flows through the selected conduit connector. As previously discussed, the primary lines may be coupled to respective distribution headers that provide the particulate material to multiple row units.

Figure 3:
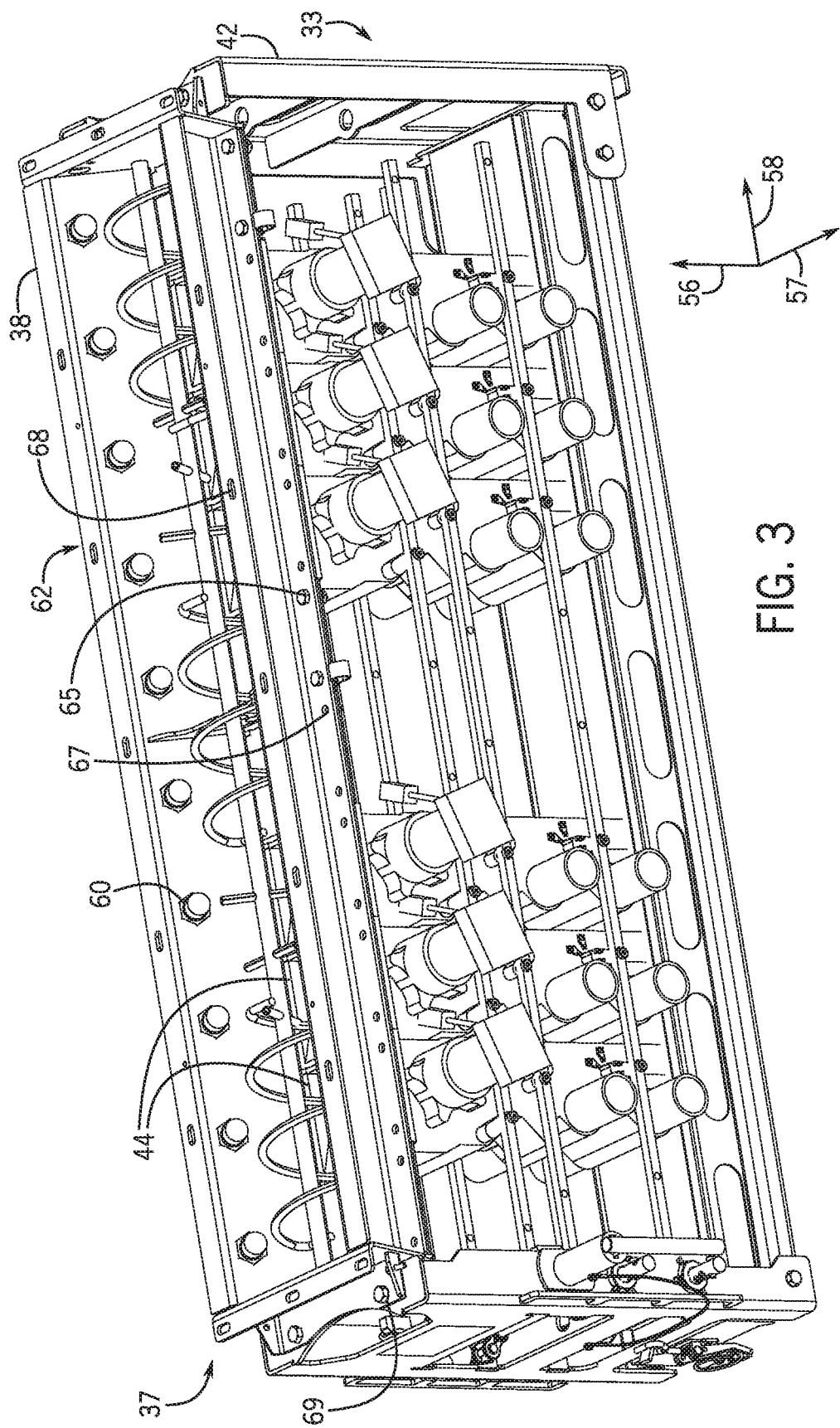
FIG. 3 is a perspective view of an embodiment of a particulate material agitation and leveling control system positioned above the metering system of FIG. 2, in accordance with an aspect of the present disclosure.

FIG. 3 is a perspective view of an embodiment of a particulate material agitation and leveling control system 37 positioned above the metering system 33 of FIG. 2. The particulate material may flow down the storage tank to the metering system 33 via the particulate material agitation and leveling control system 37. In the illustrated embodiment, the particulate material agitation and leveling control system 37 includes sensors 60 and an agitation and leveling system 62. In certain embodiments, some or all of the sensors 60 may be omitted from the particulate material agitation and leveling control system 37. The particulate material agitation and leveling control system 37 may be disposed within or below the storage tank just above the metering system 33. As shown, the particulate material agitation and leveling control system 37 is disposed above the metering system 33 with respect to the vertical axis 56, such that the particulate material may flow from the particulate material agitation and leveling control system 37 into the inlets 44 of the material meters 40. In some embodiments, the particulate material may pass through other features of the agricultural system (e.g., air cart) before entering the metering system 33.

In the illustrated embodiments, the particulate material agitation and leveling control system 37 includes a hopper 38. The hopper 38 is secured to the frame 42 of the metering system 33 by fasteners 65, which are disposed through holes 67 and 69 of the hopper. First holes 67 are arranged along a length of the hopper 38 (e.g., along the longitudinal axis 58), and second holes 69 are arranged along a width of the hopper 38 (e.g., along the lateral axis 57). The hopper 38 also includes third holes 68 configured to receive fasteners for securing the hopper 38 to the storage tank or other portion of the agricultural system (e.g., air cart).

FIG. 4 is a top perspective view of the particulate material agitation and leveling control system 37 of FIG. 3. As illustrated, an agitator 63 of the agitation and leveling system 62 is disposed within the hopper 38 and extends along the longitudinal axis 58. The agitator 63 includes a shaft 64 coupled to a drive system 78 and a wrapped wire 66 coupled to the shaft 64. As such, the agitation and leveling system 62 is coupled to the drive system 78. In certain embodiments, the particulate material agitation and leveling control system 37 may include the drive system 78. As illustrated, the wrapped wire 66 is a generally cylindrical coil wrapped around the shaft 64 (e.g., three wrapped coils coupled to the shaft 64 via radial bars). The particulate material may flow between the shaft 64 and the wrapped wire 66. In certain embodiments, the wrapped wire may be in conical form, helical form, and other suitable forms configured to allow the particulate material to pass through the agitation and leveling system. In the illustrated embodiment, the agitator 63 may rotate in a first direction 72 and in a second direction 73 (e.g., a direction opposite the first direction) to move the particulate material within the hopper 38 and/or within the storage tank (e.g., to agitate and/or to level the particulate material). In certain embodiments, other types of agitators may be used in the agitation and leveling system (e.g., an agitator that moves linearly in the hopper to move the particulate material). In some embodiments, the agitator may be mounted higher in the storage tank relative to the hopper. For example, the agitator may be disposed above the hopper.

As the particulate material rests in the storage tank, the particulate material may clump together to form pieces that are larger than desired (e.g., larger than inlets of the material meters). When the particulate material flows through the agitation and leveling system 62, the clumps of particulate material break into smaller pieces more suitable for flowing through the metering system 33. For example, the agitator 63 may rotate to agitate the particulate material, thereby breaking up the clumps. Additionally or alternatively, as the particulate material is dispensed from the storage tank, the particulate material may become unevenly distributed and/or may generate an undesirable profile within the storage tank. Rotation of the agitator 63 may level the particulate material to form the desired profile within the storage tank.

As described herein, the drive system 78 may operate the agitation and leveling system 62 in certain operating modes (e.g., the agitation mode and the leveling mode). In the agitation mode, the agitator 63 of the agitation and leveling system 62 may rotate in the first direction 72 and in the second direction 73 to agitate the particulate material, thereby reducing clumping of the particulate material within the storage tank and/or within the hopper 38. For example, the drive system 78 may rotate the agitator 63 in the first direction 72 for a first period of time and in the second direction 73 for a second period of time. The first period of time and/or the second period of time may be any duration generally between one second and five minutes. In the leveling mode, the drive system 78 may rotate the agitator 63 in the first direction 72 and/or in the second direction 73 to move the particulate material toward the first end 74 of the hopper 38 and the area of the storage tank generally above the first end 74, toward the second end 75 of the hopper 38 and the area of the storage tank generally above the second end 75, toward a center of the hopper 38, outwardly to both the first end 74 and the second end 75, toward other portions of the storage tank and/or of the hopper 38, or a combination thereof. For example, the drive system 78 may rotate the agitator 63 to move the particulate material toward a portion of the storage tank 26 and/or of the hopper 38 that generally contains less particulate material than other portion(s), thereby leveling the particulate material generally along the longitudinal axis 58. In the leveling mode, the drive system 78 may rotate the agitator 63 in the first direction 72 and/or in the second direction 73 for any suitable period of time generally between one second and five minutes.

In certain embodiments, the agitation and leveling system 62 may operate in the agitation mode about eighty percent of the time that the agitation and leveling system 62 is operating and may operate in the leveling mode about twenty percent of the time that the agitation and leveling system 62 is operating. In other embodiments, the agitation and leveling system 62 may operate in the agitation mode and/or in the leveling mode other suitable percentages of the time that the agitation and leveling system 62 is operating.

In certain embodiments, the leveling mode of the agitation and leveling system 62 may generally utilize more power compared to the agitation mode, because the drive system 78 may rotate the agitator 63 for a longer duration in the leveling mode compared to the agitation mode. In other embodiments, the agitation mode may generally utilize more power compared to the leveling mode due to the type of particulate material, a size of the storage tank and/or the hopper, an amount of the particulate material within the storage tank and/or the hopper, and other factors. As described in greater detail below, the controller of the particulate material agitation and leveling control system 37 is configured to control the agitation and leveling system 62 to operate in the agitation mode or the leveling mode based on the amount and/or distribution of the particulate material within the storage tank and/or within the hopper 38 (e.g., the amount of the particulate material determined based on the sensed load on the drive system 78). For example, the controller may instruct the drive system 78 to operate the agitation and leveling system 62 in the leveling mode only when leveling of the particulate material is beneficial and in the agitation mode for a remainder of the time that the agricultural implement is operating and/or that the particulate material is flowing through the metering system. As such, the particulate material agitation and leveling control system 37 may enhance an efficiency of the agitation and leveling system 62 and the agricultural implement generally (e.g., may reduce a duty cycle of the drive system 78 and/or may enable the agitation and leveling system 62 to use less power) by selecting the operating mode based on certain factors (e.g., based on the measured load on the drive system 78).

The drive system 78 of the particulate material agitation and leveling control system 37 is configured to drive the agitator 63 to rotate. The drive system 78 may include a motor configured to drive an agitator to rotate (e.g., an electric motor, hydraulic motor, etc.). In the illustrated embodiment, the drive system 78 includes a single motor disposed at end of the hopper 38, however, the drive system may include more than one motor (e.g., 2, 3, 4, 5, etc.). For example, the drive system may include a motor disposed at each end of the hopper. The drive system may also include motor(s) disposed along the length of the hopper. Motor(s) disposed along the length of the hopper may be connected to the agitator and may be configured to drive the agitator to rotate.

As illustrated, the particulate material agitation and leveling control system 37 includes a sensor 80 (e.g., a drive system load sensor) coupled to the drive system 78 and configured to detect a measured load on the drive system 78 (e.g., a measured torque on the drive system 78 caused by the agitation and leveling system 62 rotating against the particulate material). For example, as the drive system 78 drives the agitator 63 to rotate, the drive system 78 may experience a load/torque. The load may depend on an amount of the particulate material within the storage tank and/or within the hopper 38, clumping of the particulate material, a type of the particulate material, the direction of rotation of the agitator 63, size(s) of the storage tank and/or of the hopper, other factors associated with the particulate material and/or the particulate material agitation and leveling control system 37, or a combination thereof. The sensor 80 may include a torque sensor, an electronic sensor, other suitable sensors configured to measure the load on the drive system 78, or a combination thereof. As such, the sensor 80 may detect a measured load on the drive system 78 and output a sensor signal indicative of the measured load to the controller of the particulate material agitation and leveling control system 37. The controller may select the operating mode of the agitation and leveling system 62 based on the measured load.

In certain embodiments, the load on the drive system 78 (e.g., the measured load) may depend on the direction of rotation of the agitator 63 and/or on a distribution of the particulate material generally above and/or adjacent to the agitator 63. For example, a first measured load on the drive system 78 while the drive system 78 rotates the agitator 63 in the first direction 72 may be greater than, less than, or generally equal to a second load on the drive system 78 while the drive system 78 rotates the agitator 63 in the second direction 73. The first measured load being greater than the second measured load, or visa versa, may indicate that more particulate material is disposed at a first end 74 of the hopper 38 and/or at a first end of the storage tank generally above the first end 74, or at a second end 75 of the hopper 38 and/or at a second end of the storage tank generally above the second end 75. As such, the measured load on the drive system 78 and/or the direction of rotation of the agitator 63 (e.g., the first direction 72 or the second direction 73) may be used by the controller to determine a distribution/profile of the particulate material within the hopper 38 and/or within the storage tank and to control the drive system 78 (e.g., to select an operating mode and a direction of rotation of the agitator 63).

In the illustrated embodiment, the agitation and leveling system 62 includes a single agitator 63. In certain embodiments, multiple agitators (e.g., 2, 3, 4, 5, 6, 7, 8, etc.) may be disposed in the hopper 38 and/or the storage tank. The agitators may be disposed in series or in parallel. In a configuration with more than one agitator, drive system(s) may drive all the agitators to move the particulate material in one or more directions. For example, the particulate material agitation and leveling control system 37 may include multiple drive systems (e.g., 2, 3, 4, 5, 6, 7, 8, etc.) with each drive system coupled to and configured to rotate one or more agitators. Additionally, a sensor may be coupled to each drive system and may be configured to detect a load on each drive system as the drive system drives the agitator(s) to rotate. Agitators may also be disposed at different levels in the hopper and/or storage tank. For example, one or more agitator(s) may be disposed in the hopper, and one or more agitator(s) may be disposed higher in the storage tank.

FIG. 5 is a cross-sectional view of an embodiment of a storage tank 26 with particulate material 82 disposed therein and coupled to the particulate material agitation and leveling control system 37 of FIG. 4. During operation, the particulate material 82 may flow from the storage tank 26, through the agitation and leveling system 62 (e.g., through the hopper 38 in which the agitation and leveling system 62 is disposed), and to the metering system. For example, the drive system 78 (e.g., the motor of the drive system 78) may drive rotation of the agitator 63 to agitate and/or to level the particulate material 82 within the storage tank 26 and/or within the hopper 38. As the agitator 63 rotates, the particulate material 82 may flow from the storage tank 26 to the metering system.

While the drive system 78 drives rotation of the agitator 63, the drive system 78 may experience a load that generally depends on the amount of the particulate material 82 within the storage tank 26 and/or within the hopper 38. For example, a greater amount of the particulate material 82 within the storage tank 26 and/or within the hopper 38 may cause the drive system 78 to experience a greater load compared to a lesser amount of the particulate material 82. As the particulate material 82 flows through the agitation and leveling system 62 to the metering system, an amount of the particulate material 82 within the storage tank 26 may decrease. As such, the load on the drive system 78 may generally decrease over time during operation of the agricultural implement (e.g., as the particulate material 82 is dispensed from the storage tank 26 and/or from the hopper 38 to the field). Additionally or alternatively, as described above, the load on the drive system 78 may vary based on the distribution of the particulate material within the hopper 38 and/or within the storage tank 26 (e.g., the amount of the particulate material generally at and/or above the first end 74 of the hopper 38, and at and/or above the second end 75 of the hopper 38). The sensor 80 of the particulate material agitation and leveling control system 37 is configured to detect the load (e.g., the measured load) on the drive system 78 and output the sensor signal indicative of the load.

Accordingly, a controller 90 of the particulate material agitation and leveling control system 37 may determine a general level of the particulate material 82, a profile of the particulate material 82, an amount of the particulate material 82, or a combination thereof, within the storage tank 26 and/or the hopper 38, and may select the operating mode of the agitation and leveling system 62 based on the measured load. As described above, the operating mode may include the agitation mode and/or the leveling mode. For example, the controller 90 is configured to receive the sensor signal indicative of the measured load on the drive system 78, and based on the measured load, the controller 90 is configured to select the operating mode of the agitation and leveling system 62.

As illustrated, the controller 90 of the particulate material agitation and leveling control system 37 includes a processor 92 and a memory 94. The processor 92 (e.g., a microprocessor) may be used to execute software, such as software stored in the memory 94 for controlling the drive system 78. Moreover, the processor 92 may include multiple microprocessors, one or more "general-purpose" microprocessors, one or more special-purpose microprocessors, and/or one or more application specific integrated circuits (ASICS), or some combination thereof. For example, the processor 92 may include one or more reduced instruction set (RISC) or complex instruction set (CISC) processors.

The memory device 94 may include a volatile memory, such as random access memory (RAM), and/or a nonvolatile memory, such as read-only memory (ROM). The memory device 94 may store a variety of information and may be used for various purposes. For example, the memory device 94 may store processor-executable instructions (e.g., firmware or software) for the processor 92 to execute, such as instructions for controlling the drive system 78. In certain embodiments, the controller 90 may also include one or more storage devices and/or other suitable components. The storage device(s) (e.g., nonvolatile storage) may include ROM, flash memory, a hard drive, or any other suitable optical, magnetic, or solid-state storage medium, or a combination thereof. The storage device(s) may store data (e.g., the measured loads on the drive system associated with each operating mode), instructions (e.g., software or firmware for controlling the drive system 78), and any other suitable data. The processor 92 and/or the memory device 94, and/or an additional processor and/or memory device, may be located in any suitable portion of the system. For example, a memory device for storing instructions (e.g., software or firmware for controlling portions of the drive system 78) may be located in or associated with the drive system 78.

In certain embodiments, the controller 90 is configured to select the operating mode by comparing the measured load to one or more threshold load(s). The threshold load(s) indicate when the agitation and leveling system 62 may transition between modes and/or activate the agitation mode or the leveling mode. For example, a measured load greater than a threshold load may indicate that the general level and the amount of the particulate material within the storage tank 26 is above a certain level (e.g., a threshold level). As such, the particulate material may be agitated to promote efficient flow of the particulate material from the storage tank 26, through the hopper 38, and to the metering system. If the measured load is at a relatively medium value, the measured load may indicate that the general level and the amount of the particulate material within the storage tank 26 and/or within the hopper 38 is at a relatively medium level (e.g., between a relatively high level and a relatively low level). As such, the particulate material may be agitated and/or leveled to promote the efficient flow of the particulate material. If the measured load is relatively low, the measured load may indicate that the general level and the amount of the particulate material within the storage tank 26 and/or within the hopper 38 is relatively low. As such, the particulate material may be leveled to promote the efficient flow of the particulate material.

In certain embodiments, the agitation and leveling system 62 may operate in the agitation mode or in the leveling mode, and the leveling mode may include variations. Each of the agitation mode and the different variations of the leveling mode may include the agitation and leveling system 62 operating at different intensities. For example, in the agitation mode, the agitation and leveling system 62 may rotate in the first direction for a relatively low amount of time, remain stationary for a relatively high amount of time (e.g., a dwell time), and rotate in the second direction for a relatively low amount of time. In a light leveling mode (e.g., a transition from the agitation mode), the agitation and leveling system 62 may include light leveling of the particulate material within the storage tank and/or the hopper. In the light leveling mode, the agitation and leveling system 62 may rotate in the first direction for a relatively high amount of time (e.g., higher than the agitation mode), remain stationary for a relatively low amount of time (e.g., lower than the agitation mode), and rotate in the second direction for a relatively high amount of time (e.g., higher than the agitation mode). In a moderate leveling mode, the agitation and leveling system 62 may rotate in the first direction for a relatively high amount of time (e.g., higher than the light leveling mode), remain stationary for a relatively low amount of time (e.g., lower than the light leveling mode), and rotate in the second direction for a relatively high amount of time (e.g., higher than the light leveling mode). In a heavy leveling mode, the agitation and leveling system 62 may rotate in the first direction for a relatively high amount of time (e.g., higher than the moderate leveling mode), remain stationary for a relatively low amount of time (e.g., lower than the moderate leveling mode), and rotate in the second direction for a relatively high amount of time (e.g., higher than the moderate leveling mode). As such, as the measured load generally decreases, the agitation and leveling system 62 may transition from the agitation mode to the leveling mode, and within the leveling mode, may transition to higher intensities to enable the agitation and leveling system 62 to efficiently level the particulate material.

The one or more threshold loads may include a first threshold load, a second threshold load generally lower than the first threshold load, and/or other threshold load(s). Additionally, each threshold load may generally correspond to an amount and/or a level of the particulate material 82 within the storage tank 26 and the hopper 38. As illustrated, the first threshold load generally corresponds to a first level 100 within the storage tank 26, and the second threshold load generally corresponds to a second level 102 within the storage tank 26.

Based on the measured load on the drive system 78 (e.g., based on the sensor signal indicative of the measured load), the controller 90 may determine the amount and/or the level of the particulate material 82 within the storage tank 26 and/or within the hopper 38. For example, in response to the measured load exceeding the first threshold load, the controller 90 may determine that the level of the particulate material 82 is generally above the first level 100 (e.g., in an agitation region 104) and may select the agitation mode. In response to the measured load being less than or equal to the first threshold load and greater than the second threshold load, the controller 90 may determine that the level of the particulate material 82 is generally below the first level 100 and above the second level 102 (e.g., in an agitation and leveling region 106) and may select the agitation mode or the leveling mode or may alternate between the two modes. In certain embodiments, the controller 90 may select a variation of the leveling mode as described above (e.g., the light leveling mode or the moderate leveling mode) based on the measured load being less than or equal to the first threshold load and greater than the second threshold load. In response to the measured load being less than or equal to the second threshold load, the controller 90 may determine that the level of the particulate material 82 is generally below the second level 102 (e.g., in a leveling region 108) and may select the leveling mode. In certain embodiments, the controller 90 may select a variation of the leveling mode as described above (e.g., the moderate leveling mode or the heavy leveling mode) based on the measured load being less than or equal to the second threshold load.

The first threshold load and the second threshold load, or the corresponding first level 100 and the corresponding second level 102, may be determined by the controller 90, based on operator input(s), based on the type of particulate material, based on operating parameters and/or a size of the agricultural implement, based on a measured maximum load (e.g., a measured maximum torque), or a combination thereof. For example, the controller 90 may determine the first threshold load and the second threshold load based on a maximum load on the drive system that is determined by the controller 90 and/or that is received via operator input. The controller 90 may determine the maximum load while the agitation and leveling system 62 is rotating, the storage tank 26 is relatively full (e.g., immediately after filling the storage tank), and the particulate material is flowing through the metering system (e.g., at the start of seeding operations). In certain embodiments, the controller 90 may receive a user input to initiate determination of the maximum load. For example, the user may provide the user input to cause the controller 90 to determine the maximum load at the start of seeding operations when the storage tank 26 is relatively full.

In certain embodiments, the controller 90 may determine the first threshold load and the second threshold load as a percentage and/or a fraction of the maximum load. For example, the first threshold load may generally be between fifty percent and seventy-five percent of the maximum load, and the second threshold load may generally be between thirty percent and fifty percent of the maximum load. In some embodiments, the first threshold load may generally be between thirty percent and fifty percent of the maximum load, and the second threshold load may generally be between ten percent and thirty percent of the maximum load. In other embodiments, the first threshold load may generally be between fifteen percent and thirty percent of the maximum load, and the second threshold load may generally be between five percent and fifteen percent of the maximum load. In certain embodiments, the first threshold load and/or the second threshold load may be other percentage values of the maximum load. Additionally or alternatively, the controller 90 may utilize more threshold loads to control the agitation and leveling system 62.

In certain embodiments, the controller 90 may compare the measured load to a single threshold load, and the controller 90 may control the agitation and leveling system 62 based on the comparison. For example, in response to the measured load being greater than or equal to the threshold load, the controller 90 may select the agitation mode and may instruct the drive system 78 to operate the agitation and leveling system 62 in the agitation mode to agitate the particulate material within the storage tank 26 and/or within the hopper 38. In response to the measured load being less than the threshold load, the controller 90 may select the leveling mode and may instruct the drive system 78 to operate the agitation and leveling system 62 in the leveling mode to level the particulate material within the storage tank 26 and/or within the hopper 38. The threshold load may be about fifty percent to about seventy-five percent of the maximum load, about thirty percent to about fifty percent of the maximum load, about fifteen percent to about thirty percent of the maximum load, about five percent to about fifteen percent of the maximum load, and/or other suitable percentages or percentage ranges of the maximum load.

In some embodiments, while operating in the agitation mode or the leveling mode, the drive system 78 may experience an increase in load over time due to the agitation and leveling system 62 compressing and/or moving the particulate material against a wall at the first end 74 of the hopper 38 or against a wall at the second end 75 of the hopper 38 (e.g., via rotation of the agitator 63). The controller 90 may be configured to identify the increased load by comparing the loads measured at different times to one another. In response to the load increasing over time, the controller 90 may instruct the drive system 78 to rotate the agitation and leveling system 62 (e.g., the agitator 63) in an opposite direction to reduce compression of the particulate material against the wall at an end of the hopper 38 and/or the storage tank 26. In some embodiments, the controller 90 may be configured to identify the compression against the wall by comparing a rate of increase in the measured loads over time to a rate of increase threshold. Additionally or alternatively, the controller 90 may be configured to identify the compression against the wall by comparing a first measured load while the agitation and leveling system 62 operates in the first direction to a second measured load while the agitation and leveling system 62 operates in the second direction. Based on the increased load over time exceeding the rate of increase threshold and/or based on a difference between the first measured load and the second measured load exceeding a difference threshold, the controller 90 may instruct the drive system 78 to rotate the agitation and leveling system 62 (e.g., the agitator 63) in an opposite direction to reduce compression of the particulate material against the wall. For example, if the controller 90 identifies compression against the right wall of the storage tank 26 and/or the hopper 38, the controller 90 may instruct the drive system 78 to rotate the agitation and leveling system 62 to move the particulate material toward the left wall. If the controller 90 identifies compression against the left wall of the storage tank 26 and/or the hopper 38, the controller 90 may instruct the drive system 78 to rotate the agitation and leveling system 62 to move the particulate material toward the right wall.

In certain embodiments, the controller 90 may determine an average measured load on the drive system 78 based on multiple sensor signals indicative of the measured loads. For example, the sensor 80 may output multiple sensor signals indicative of the measured loads over a period of time (e.g., one second, two seconds, five seconds, ten seconds, thirty seconds, one minute, two minutes, five minutes, etc.). The controller 90 may average the multiple measured loads and may control the drive system 78 based on the average measured load (e.g., the controller 90 may compare the average measured load to the threshold load(s) and may select the operating mode and control the drive system 78 based on the comparison). Averaging the measured loads on the drive system 78 may enable the controller 90 to filter spikes in the measured load of the drive system 78. For example, during operation, certain material (e.g., clumps of particulate material and/or debris) may temporarily and at least partially increase rotational resistance of the agitator 63, which may cause a spike in the load on the drive system 78. After the clump of the particulate material is broken down and/or after the debris pass through the agitator 63, the load on the drive system 78 may decrease. As such, controlling the drive system 78 based on the average measured load may substantially reduce the possibility of switching modes in response to transient conditions.

As illustrated, the particulate material agitation and leveling control system 37 includes a user interface 120 configured to inform an operator of the operating mode of the agitation and leveling system 62, to provide the operator with selectable options of the particulate material agitation and leveling control system 37, and to enable other operator interactions. The user interface 120 includes a display 122 and a user interaction device 124. The display 122 may present information to the operator, such as selectable options of the operating mode, information related to the operating mode selected by the controller 90, a graphical representation of the level of the particulate material within the storage tank 26 and/or within the hopper 38, or a combination thereof. The user interaction device 124 may include button(s) and/or input device(s) that enable interaction with the particulate material agitation and leveling control system 37. For example, based on the level of the particulate material displayed by the display 122, the operator may select the operating mode via the display 122 (e.g., in embodiments in which the display is a touch screen) and/or via the user interaction device 124. In certain embodiments, the controller 90 of the particulate material agitation and leveling control system 37 may select the operating mode in addition to, or independent of, the operator interaction via the user interface 120.

In certain embodiments, the controller 90 may instruct the drive system 78 to operate the agitation and leveling system 62 in a door dump mode. For example, the door dump mode may be an operating mode of the agitation and leveling system 62 (e.g., in addition to the agitation mode and the leveling mode). As illustrated, the storage tank 26 includes a side door 126 configured to enable the user of the implement to deposit particulate material into the storage tank 26 and/or into the hopper 38. For example, the user may open the side door 126, deposit the particulate material into the storage tank 26 and/or into the hopper 38 through the side door 126, and close the side door 126. After depositing the particulate material, the particulate material may be distributed unevenly such that more particulate material is disposed adjacent to the side 126 and an area generally below the side door 126 relative to the rest of the storage tank 26 and the hopper 38. In the door dump mode, the drive system 78 may rotate the agitation and leveling system 62 to generally move the particulate material away from the side door 126 and to distribute the particulate material within the storage tank 26 and/or within the hopper 38. The door dump mode may be initiated via the user interface 120 (e.g., the user may select the door dump mode via the display 122 after depositing the particulate material through the side door 126) and/or may be initiated automatically via detection of the side door 126 opening and closing.

In the door dump mode, the drive system 78 may rotate the agitation and leveling system 62 for a specific time period and/or based on the measured load on the drive system 78. For example, the drive system 78 may rotate the agitation and leveling system 62 for a time period of thirty seconds, fifty seconds, eighty-five seconds, one hundred seconds, one hundred twenty seconds, one hundred fifty seconds, and other suitable time periods that enable the agitation and leveling system 62 to distribute the particulate material within the storage tank 26 and/or the hopper 38 and to generate a desirable profile of the particulate material. Additionally or alternatively, the controller 90 may compare the measured load on the drive system 78 (e.g., as detected by the sensor 80) to a threshold value, select the operating mode of the agitation and leveling system 62 based on the measured load (e.g., from the door dump mode, the agitation mode, and the leveling mode), and instruct the drive system 78 to operate the agitation and leveling system based on the selected operating mode. In some embodiments, the controller 90 may instruct the drive system 78 to operate the agitation and leveling system 62 in the door dump mode until the measured load on the drive system 78 reaches a threshold load.

FIG. 6 is a flow diagram of an embodiment of a process 130 for controlling the particulate material agitation and leveling control system. For example, the process 130, or portions thereof, may be performed by the controller of the particulate material agitation and leveling control system. The process 130 begins at block 132, in which operating parameter inputs are received. The operating parameter inputs may include the type of the particulate material, a speed of the agricultural implement, a speed of meter roller(s) configured to meter the particulate material, a size and/or model of the storage tank and/or of the agricultural implement, weather conditions, soil conditions, a flow rate of the particulate material from the storage tank, or a combination thereof. The operating parameter inputs may be received via the user interface of the particulate material agitation and leveling control system, may be stored in the memory of the controller, may be received via sensors of the agricultural implement, may be received from a transceiver, or a combination thereof.

At block 134, the agitation and leveling system is activated which causes the agitation and leveling system to agitate and/or level the particulate material within the storage tank and/or within the hopper coupled to the storage tank. Upon activation of the agitation and leveling system, the maximum load on the drive system is established (e.g., block 136). For example, the agitation and leveling system may be activated at the start of a seeding operation when the storage tank is relatively full. The maximum load may correspond to the load experienced by the drive system while the storage tank is relatively full. As described herein, in certain embodiments, one or more threshold loads may be established as percentages or as percentage ranges of the maximum load.

At block 138, a signal is received indicative of the measured load on the drive system. For example, the controller of the particulate material agitation and leveling control system may receive the sensor signal indicative of the measured load from the sensor coupled to the drive system. At block 140, the operating mode is selected from the agitation mode and the leveling mode. In some embodiments, the operating mode may be selected based on a comparison of the measured load to the one or more threshold loads. In certain embodiments, the operating mode may be selected from the door dump mode, the agitation mode, and the leveling mode.

At block 142, the drive system is instructed to operate the agitation and leveling system based on the operating mode (e.g., the controller, via the processor, may output a control signal to the drive system based on the operating mode). For example, if the agitation mode is selected, the controller may output a control signal to the drive system indicative of instructions to operate the agitation and leveling system in the agitation mode. If the leveling mode is selected, the controller may output a control signal to the drive system indicative of instructions to operate the agitation and leveling system in the leveling mode. If the door dump mode is selected, the controller may output a control signal to the drive system indicative of instructions to operate the agitation and leveling system in the door dump mode.

After completing block 142, the process 130 returns to block 138 and receives the next signal indicative of the measured load on the drive system. The next operating mode is selected (e.g., the block 140), which may be the same operating mode or a different operating mode compared to the previous operating mode. As such, blocks 138-142 of the process 130 may be iteratively performed by the controller of the particulate material agitation and leveling control system to agitate and/or to level the particulate material within the storage tank and/or within the hopper.

The particulate material agitation and leveling control system described herein may enable efficient operation of an agitation and leveling system. For example, as the agitation and leveling system operates to agitate and/or level particulate material within a storage tank and/or within a hopper, the controller of the particulate material agitation and leveling control system may receive a signal indicative of a measured load on a drive system coupled to the agitation and leveling system. Based on the measured load, the controller may select an operating mode of the agitation and leveling system from an agitation mode and/or a leveling mode. Additionally, the controller may control a drive system based on the operating mode, thereby controlling the agitation and leveling system. Selection of the operating mode by the particulate material agitation and leveling control system may facilitate efficient control of the agitation and leveling system to operate in the agitation mode and/or the leveling mode. For example, the drive system may generally utilize less power via selection of an operating mode. Additionally, the duty cycle of the drive system may be reduced, thereby extending a working life of the drive system. As such, the power utilized by the agitation and leveling system may be reduced while providing effective agitation and leveling. Thus, the particulate material agitation and leveling control system may improve an operational and a general efficiency of the agricultural implement.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An agricultural particulate material agitation and leveling control system, comprising:
  a controller comprising a memory and a processor, wherein the processor is configured to:
    receive a sensor signal indicative of a measured load on a drive system coupled to an agitation and leveling system;
    select an operating mode of the agitation and leveling system from an agitation mode and a leveling mode based on the measured load; and instruct the drive system to operate the agitation and leveling system based on the operating mode.

2. The agricultural particulate material agitation and leveling control system of claim 1, wherein the processor is configured to:
receive a signal indicative of a maximum load on the drive system;
determine a threshold load based on the maximum load; and
select the operating mode from the agitation mode and the leveling mode based on the measured load and the threshold load.

3. The agricultural particulate material agitation and leveling control system of claim 2, wherein the processor is configured to select the agitation mode in response to the measured load being greater than or equal to the threshold load.

4. The agricultural particulate material agitation and leveling control system of claim 2, wherein the processor is configured to select the leveling mode in response to the measured load being less than the threshold load.

5. The agricultural particulate material agitation and leveling control system of claim 2, wherein the threshold load is about fifty percent to about seventy-five percent of the maximum load.

6. The agricultural particulate material agitation and leveling control system of claim 1, comprising a sensor coupled to the drive system and configured to output the sensor signal.

7. The agricultural particulate material agitation and leveling control system of claim 6, wherein the sensor comprises a torque sensor configured to detect the measured load on the drive system.

8. The agricultural particulate material agitation and leveling control system of claim 1, wherein the leveling mode comprises a light leveling mode, a moderate leveling mode, a heavy leveling mode, or a combination thereof, and the processor is configured to select the light leveling mode, the moderate leveling mode, or the heavy leveling mode based on the measured load.

9. The agricultural particulate material agitation and leveling control system of claim 1, wherein the processor is configured to output a control signal to a user interface indicative of instructions to inform an operator of the operating mode.

10. An agricultural particulate material agitation and leveling control system, comprising:
an agitation and leveling system configured to be disposed over a metering system;
a drive system coupled to and configured to drive the agitation and leveling system in rotation;
a sensor configured to output a sensor signal indicative of a measured load on the drive system; and
a controller communicatively coupled to the sensor and to the drive system, wherein the controller comprises a memory and a processor, and the processor controller is configured to:
receive the sensor signal from the sensor indicative of the measured load on the drive system;
select an operating mode of the agitation and leveling system from an agitation mode and a leveling mode based on the measured load; and
instruct the drive system to operate the agitation and leveling system based on the operating mode.

11. The agricultural particulate material agitation and leveling control system of claim 10, wherein the leveling mode comprises a light leveling mode, a moderate leveling mode, a heavy leveling mode, or a combination thereof, and the processor is configured to select the light leveling mode, the moderate leveling mode, or the heavy leveling mode based on the measured load.

12. The agricultural particulate material agitation and leveling control system of claim 10, wherein the processor is configured to:
receive a signal indicative of a maximum load on the drive system; determine a threshold load based on the maximum load;
and
select the operating mode from the agitation mode and the leveling mode based on the measured load and the threshold load.

13. The agricultural particulate material agitation and leveling control system of claim 12, wherein the processor is configured to determine the threshold load based on one or more operator inputs, a type of particulate material, operating parameters, a size of an agricultural implement, or a combination thereof.

14. The agricultural particulate material agitation and leveling control system of claim 10, wherein the processor is configured to identify compression against a wall of a storage tank generally above the agitation and leveling system by comparing a rate of increase in the measured load over time to a rate of increase threshold.

15. The agricultural particulate material agitation and leveling control system of claim 14, wherein the processor is configured to instruct the drive system to operate the agitation and leveling system based on the rate of increase exceeding the rate of increase threshold.

16. The agricultural particulate material agitation and leveling control system of claim 10, wherein the agitation and leveling system comprises an agitator having a shaft coupled to the drive system and a wrapped wire coupled to the shaft and wrapped generally around the shaft.

17. At least one non-transitory computer readable medium comprising executable instructions that, when executed by a processor, cause the processor to:
receive a sensor signal indicative of a measured load on a drive system coupled to and agricultural agitation and leveling system;
select an operating mode of the agitation and leveling system from an agitation mode and a leveling mode based on the measured load; and
instruct the drive system to operate the agitation and leveling system based on the operating mode.

18. The at least one non-transitory computer readable medium of claim 17, wherein the instructions are configured to cause the processor to:
determine a threshold load based on a maximum load, one or more inputs, or both; and
select the operating mode from the agitation mode and the leveling mode based on the measured load and the threshold load.

19. The at least one non-transitory computer readable medium of claim 18, wherein the one or more inputs comprise a type of particulate material, a speed of an agricultural implement including the agitation and leveling system, a speed of a meter roller configured to meter the particulate material flowing from the agitation and leveling system, or a combination thereof.

20. The at least one non-transitory computer readable medium of claim 18, wherein the threshold load is about ten percent to about thirty percent of the maximum load.

* * * * *